US009936310B2

(12) United States Patent
Buehl

(10) Patent No.: US 9,936,310 B2
(45) Date of Patent: Apr. 3, 2018

(54) WIRELESS STEREO HEARING ASSISTANCE SYSTEM

(71) Applicant: SONOVA AG, Stäfa (CH)

(72) Inventor: Markus Buehl, Cudrefin (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/037,159

(22) PCT Filed: Dec. 10, 2013

(86) PCT No.: PCT/EP2013/076059

§ 371 (c)(1),
(2) Date: May 17, 2016

(87) PCT Pub. No.: WO2015/086045

PCT Pub. Date: Jun. 18, 2015

(65) Prior Publication Data

US 2016/0286323 A1 Sep. 29, 2016

(51) Int. Cl.
*H04B 5/00* (2006.01)
*H04R 25/00* (2006.01)

(52) U.S. Cl.
CPC ......... *H04R 25/554* (2013.01); *H04B 5/0006* (2013.01); *H04R 25/305* (2013.01); *H04R 25/552* (2013.01); *H04R 2205/041* (2013.01); *H04R 2420/07* (2013.01)

(58) Field of Classification Search
CPC .. H04R 25/554; H04R 25/305; H04R 25/552; H04R 2205/041; H04R 2420/07; H04B 5/006
See application file for complete search history.

(56) References Cited

U.S. PATENT DOCUMENTS

| | | | |
|---|---|---|---|
| 7,545,944 B2 | 6/2009 | Allegro Baumann et al. | |
| 7,648,919 B2 | 1/2010 | Tran et al. | |
| 8,158,476 B2 | 4/2012 | Tran et al. | |
| 8,345,900 B2 | 1/2013 | Marquis et al. | |
| 8,565,444 B2 | 10/2013 | Johnson | |
| 9,014,379 B2 | 4/2015 | Rank et al. | |
| 2001/0006518 A1* | 7/2001 | Takabatake ......... | H04L 12/4011 370/352 |

(Continued)

FOREIGN PATENT DOCUMENTS

| | | |
|---|---|---|
| EP | 1 531 650 A2 | 5/2005 |
| EP | 1 981 176 A1 | 10/2008 |

(Continued)

*Primary Examiner* — Sonia Gay

(57) ABSTRACT

A hearing assistance system having an audio signal wireless transmission unit for transmitting a stereo audio signal with left and right ear channels, a first ear unit for being worn at a user's ear and having a hearing instrument and a wireless audio signal receiver unit, the hearing instrument providing the first receiver unit with information as to which ear of the user the hearing instrument is being worn and information as to whether, or not, there is a like second ear unit. The first receiver unit is adapted to decide, depending on the received information as to which ear the first hearing instrument is fitted and whether a second ear unit is worn at the other ear, to receive one of the right and left ear channels, and, in absence of a stereo channel, to supply the respective mono channel of the audio signal to the first hearing instrument.

14 Claims, 3 Drawing Sheets

(56) References Cited

U.S. PATENT DOCUMENTS

| | | | | |
|---|---|---|---|---|
| 2005/0100182 | A1 | 5/2005 | Sykes et al. | |
| 2007/0149261 | A1* | 6/2007 | Huddart | H04R 5/033 455/575.2 |
| 2007/0223725 | A1* | 9/2007 | Neumann | H04R 5/04 381/80 |
| 2009/0154739 | A1* | 6/2009 | Zellner | H04R 1/1041 381/311 |
| 2010/0067707 | A1 | 3/2010 | Schwerdtner | |
| 2010/0067723 | A1 | 3/2010 | Bergmann et al. | |
| 2010/0195836 | A1* | 8/2010 | Platz | G09B 21/006 381/26 |
| 2011/0144779 | A1 | 6/2011 | Janse et al. | |
| 2011/0188662 | A1* | 8/2011 | Jensen | H04R 25/552 381/23.1 |
| 2011/0286615 | A1 | 11/2011 | Olodort et al. | |
| 2012/0003937 | A1* | 1/2012 | Zhong | H04M 1/6066 455/41.3 |
| 2012/0020492 | A1* | 1/2012 | Brown | H04R 1/1041 381/74 |
| 2012/0314890 | A1 | 12/2012 | El-Hoiydi et al. | |
| 2013/0129126 | A1 | 5/2013 | Callias et al. | |
| 2013/0279724 | A1 | 10/2013 | Stafford et al. | |

FOREIGN PATENT DOCUMENTS

| | | | |
|---|---|---|---|
| WO | 2004/110099 | A2 | 12/2004 |
| WO | 2006/104634 | A2 | 10/2006 |
| WO | 2007/110807 | A2 | 10/2007 |
| WO | 2008/122665 | A1 | 10/2008 |
| WO | 2008/138365 | A1 | 11/2008 |
| WO | 2011/098142 | A1 | 8/2011 |
| WO | 2011/146659 | A2 | 11/2011 |

* cited by examiner

WIRELESS STEREO HEARING ASSISTANCE SYSTEM

BACKGROUND OF THE INVENTION

Field of the Invention

The invention relates to a hearing assistance system comprising an audio signal transmission unit for wireless transmission of a stereo audio signal and at least one ear worn unit comprising a hearing instrument, such as a hearing aid, and a wireless audio signal receiver unit for supplying the hearing instrument with an audio signal received from the transmission unit.

Description of Related Art

Wireless audio signal transmission systems may comprise wireless microphones which are used for transmitting audio signals captured from the voice of a speaker to ear level hearing instruments. For example, wireless microphones may be used by teachers teaching hearing impaired persons in a class room (wherein the audio signal is captured by the wireless microphone of the teacher are transmitted to a plurality of receiver units worn by the hearing persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another application of wireless audio transmission systems is the case in which the transmission unit is designed as an assistive listening device. In this case, the transmission unit may include a wireless microphone for capturing ambient sound, in particular from a speaker close to the user, and/or a gateway to an external audio device, such as a mobile phone, a TV set or a HiFi system; in this case the transmission unit serves to supply external audio signals to the receiver units worn by the user.

A wireless audio link may be, for example, implemented as an FM (frequency modulation) radio link operating in the 200 MHz frequency band. Examples of analog wireless FM systems, particularly suited for school applications, are described in European Patent Application EP 1 864 320 A1 which corresponds to U.S. Pat. Nos. 7,648,919; 8,158,476; and 8,345,900.

In recent systems the analog FM transmission technology is replaced by employing digital modulation techniques for audio signal transmission, most of them working on other frequency bands than the former 200 MHz band, such as in the 2.4 GHz ISM band.

In general, audio signal receiver units may be integrated within hearing instrument, or they may be provided as a separate device which is connected to the hearing instrument via a standardized electric and mechanic interface ("audio shoe").

European Patent Application EP 1 531 650 A2 and corresponding U.S. Patent Application Publication US 2005/0100182 A1 relate to a wireless hearing assistance system wherein the transmission unit is designed as an assistive listening device which may transmit a stereo audio signal via a first frequency channel which transmits a first portion of the stereo signal to a first hearing instrument and a second portion of the stereo signal via a second frequency channel to a second hearing instrument.

U.S. Patent Application Publication US 2006/0233385 A1 relates to a binaural hearing aid system wherein the gain setting in each of the two hearing aids is changed depending on whether the other hearing aid is active or not, with the activity to the other hearing aid being checked via a binaural link.

U.S. Pat. No. 9,014,379 B2 relates to a binaural hearing aid system, wherein in each of the two hearing aids the parameter setting of both hearing aids is stored, and wherein the hearing aids are provided with a communication link for exchanging the parameter settings between each other.

International Patent Application Publication WO 2004/110099 A2 relates to a Bluetooth type wireless network, wherein two binaural hearing aids are connected to each other and to external devices, like a mobile phone, via the network.

U.S. Pat. No. 8,565,444 B2 relates to a smartphone which senses the presence of one or two speakers in a headset and a microphone in order to adjust audio output signal of the smartphone according to the stereo or mono capability of the headset connected to the audio output.

International Patent Application Publication WO 2011/146659 A2 and corresponding U.S. Patent Application Publication 2011/0286615 relate to a stereo headset divided into two sub-systems, each one comprising an earpiece; one of the earpieces acts as a master in a network configuration with a Bluetooth type communication device, and the other earpiece acts as a slave, with information received by the master, such as information concerning stereo or mono signal choices, being transmitted to the slave device.

International Patent Application Publication WO 2008/122665 A1 and corresponding U.S. Patent Application Publication 2010/0067723 relate to user interface of a body-worn communication device for communicating with the head-worn listening device; the user interface may be used for manual signal selection and for manual change of hearing aid settings.

International Patent Application Publication 2007/110807 and corresponding U.S. Patent Application Publication 2011/0144779 relate to a headphone for a portable media player, which is capable of detecting the headphone configuration in order to switch from a mono to a stereo signal.

SUMMARY OF THE INVENTION

It is an object of the invention to provide for a wireless hearing assistance system comprising an audio signal transmission unit capable of wireless transmission of a stereo audio signal and at least one ear unit comprising a hearing instrument and a wireless audio signal receiver unit, wherein the system should be particularly easy to be used. It is a further object to provide for a corresponding hearing assistance method.

According to the invention, these objects are achieved by a hearing assistance system and method as described herein.

The invention is beneficial in that, by providing the receiver unit with information as to whether the respective the hearing instrument is fitted to the left ear or the right ear and with information as to whether, or not, there is a second ear unit worn at the other ear, and by designing the receiver unit to decide, depending on that information, to receive one of the left ear channel, the right ear channel and, if available, the respective mono channel of the audio signal and to supply it to the hearing instrument, an automatic—and thus very easy—handling of stereo signals is realized, i.e., the suitable stereo channel is recognized and supplied to the hearing instrument without the need for user interaction, irrespective of whether the user is wearing only one hearing instrument or two hearing instruments.

Hereinafter, examples of the invention will be illustrated by reference to the accompanying drawings.

DETAILED DESCRIPTION OF THE INVENTION

Figure 1:
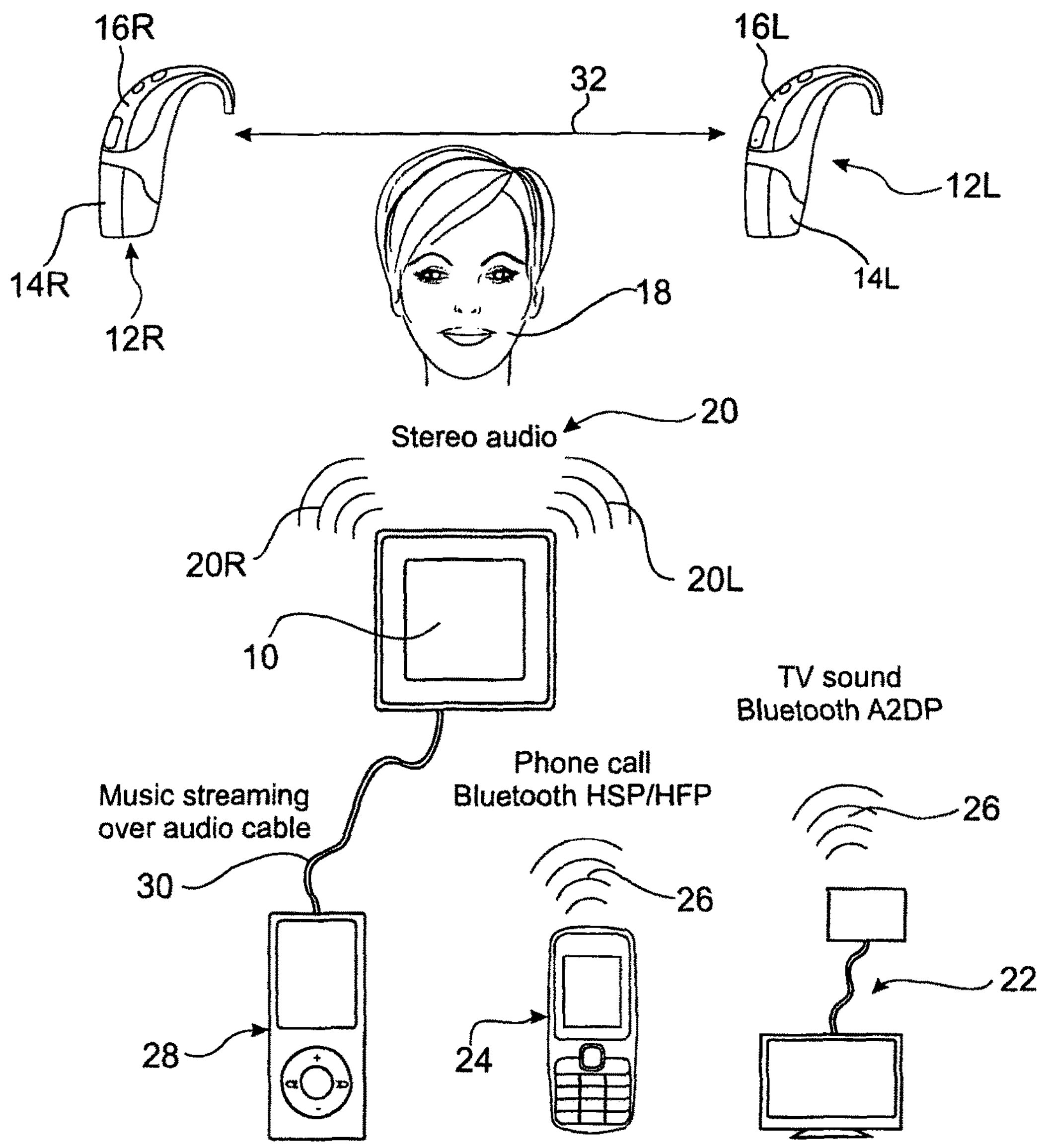
FIG. 1 is a schematic representation of an example of a binaural hearing assistance system according to the invention.

In FIG. 1 a schematic example of a hearing assistance system is shown, comprising an audio signal transmission unit 10, a right ear unit 12R comprising an audio signal receiver unit 14R and a hearing aid 16R, and a left ear unit 12L comprising an audio signal receiver unit 14L and a hearing aid 16L. The right ear unit 12R is worn at the right ear of a user 18, and the left ear unit 12L is worn at the left ear of the user 18.

The transmission unit 10 is provided for transmitting a stereo audio signal to the ear units 12R and 12L via a wireless audio link 20 transmitting the right ear stereo channel 20R and the left ear stereo channel 20L. The stereo audio signal may be supplied to the transmission unit 10 from external audio devices, such a TV set 22 or a mobile phone 24 via a wireless link 26 (such as a Bluetooth link) or from external audio devices, such as a music player 28, via a wired connection 30. In case that the audio signal supplied to the transmission unit 10 from the external audio device is a mono signal (such as from the mobile phone 24), the same mono signal will be transmitted by the transmission unit 10 via both channels 20R, 20L. In case that the audio signal supplied to the transmission unit 10 from the external device is a stereo signal, the transmission unit 10 typically transmits the signal as a stereo signal to the ear units 12R, 12L.

According to an alternative embodiment, the transmission unit 10 may be omitted in case that the audio source, i.e., the respective external audio device, such as the TV set 22, the mobile phone 24 or the music player 28, is able to directly stream the audio signals to the respective ear unit 12R, 12L.

The hearing aids 16R, 16L may be designed to exchange audio signals and/or control signals via a wireless, preferably inductive, link 32 in order to realize the binaural system.

The transmission unit 10 typically may be worn on the body of the user 18 of the hearing aids 16, for example on a neck loop. If the transmission unit 10 is designed as a mere audio streaming device, it does not comprise a microphone.

The stereo audio link 20 may be implemented, for example, as an analog FM link, or it may be realized as an analog or digital inductive link or as a digital HF link using, for example, the 2.4 GHz ISM band.

The transmission unit 10 is not restricted to body worn designs in case that the audio link 20 is implemented as a radio link (i.e., not as an inductive link)

Figure 2:
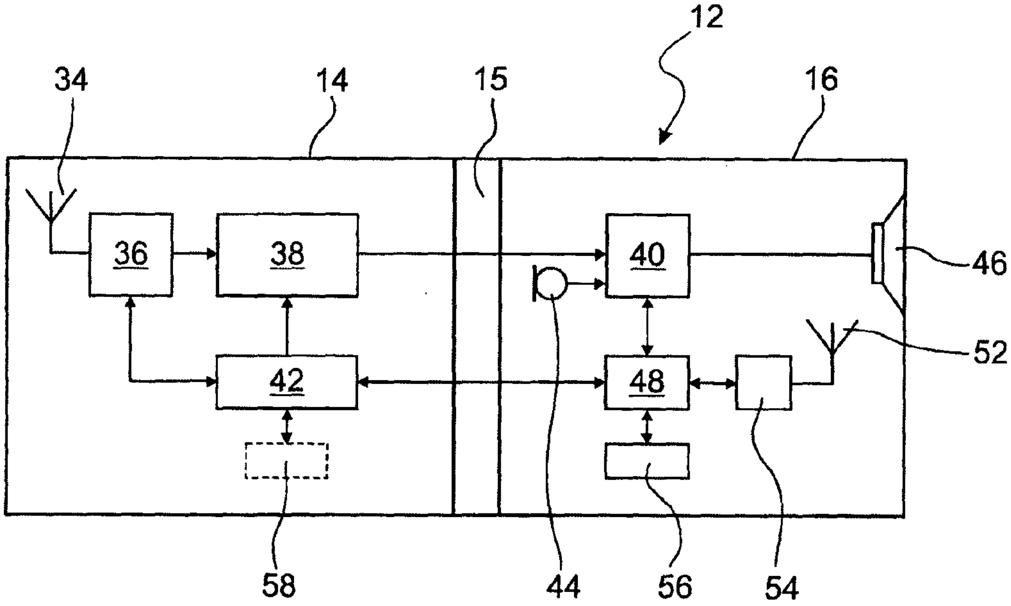
FIG. 2 is a schematic block diagram of one of the ear units of the system of FIG. 1.

In FIG. 2, a schematic example of one of the ear units 12 is shown, wherein the receiver unit 14 is connected via a mechanic and electric interface ("audio shoe") 15 to the hearing aid 16.

The receiver unit 14 comprises an antenna 34, a receiver (or transceiver) 36 for receiving the audio signals transmitted via the link 20. The received audio signals are supplied to an audio signal processing unit 38 which supplies the processed signals to an audio input of the hearing aid 16 in order to supply the received audio signals to the audio signal processing unit 40 of the hearing aid 16. The receiver unit 14 also comprises a controller 42 for controlling the receiver 36 and the signal processing unit 38.

The hearing aid 16 comprises a microphone arrangement 44 for capturing audio signals from ambient sound and supplying them to the signal processing unit 40. The output of the signal processing unit 40 supplied to the electroacoustic output transducer (loudspeaker) 46. The hearing aid 16 also comprises a controller 48 for controlling the signal processing unit 40 and a memory 56. In case that the hearing aid 16 is designed as part of a binaural system, it also comprises an antenna 52 and a transceiver 54 for establishing the binaural link 32. The memory 56 contains fitting information of the hearing aid 16, e.g. the individual values of the fitting parameters, such as gain settings and frequency response curves, and information as to whether the hearing aid 16 is fitted to the left ear or to the right ear of the user 18. The memory 56 also may contain information as to whether there is a second ear unit 12 comprising another hearing aid 16 at the other ear, i.e. information as to whether the hearing aid 16 is part of a binaural fitting or not.

In case that the hearing aid 16 is provided with an antenna 52 and a transceiver 54 for establishing a binaural link 32, the hearing aid 16 can easily determine whether there is a hearing aid 16 worn at the other ear or not, namely from the fact whether binaural communication with another hearing instrument is possible or not (due to the limited range of such binaural wireless link 32, which typically is an inductive link, the hearing aid 16 usually could communicate only a hearing aid worn by the same user 18).

The hearing aid 16 is adapted to provide the receiver unit 14, via the interface 15, with information as to which ear the hearing aid 16 is fitted to and as to whether a second ear unit 12 is present at the other ear. This information is used by the controller 42 to decide whether the left ear channel 20L or the right ear channel 20R of the stereo signal or, if available, the respective mono channel of the audio signal is to be received/decoded and is to be supplied to the hearing aid 16.

Typically, the receiver unit 14 will be designed to decide to receive/decode that channel of the stereo signal corresponding to the ear to which the hearing aid 16 connected to the receiver unit 14 is fitted to: if the hearing aid 16 is fitted to the right ear, the receiver unit 14 will receive and supply the right ear channel 20R, and if the hearing aid 16 is fitted to the left ear, the receiver unit 14 will receive and supply the left ear channel 20L, irrespective of whether another ear unit 12 is present at the other ear or not.

However, in some cases it may be preferable that the receiver unit 14 receives and supplies the mono channel of the audio signal in case that no ear unit 12 is worn at the other ear. This is automatically set in the receiver unit 14.

In case that the hearing aid 16 is not designed for establishing a binaural link 32, information as to whether there is another ear unit 12 or not may be stored in a memory 58 of the receiver unit 14. Alternatively, in case that the receiver unit 14 is capable of establishing communication with another receiver unit 14, the receiver unit 14 may determine, from the fact whether it is possible or not to establish communication with another receiver unit 14, whether there is another ear unit 12 worn at the other ear.

In case of a binaural system both ear units 12R, 12L typically will be identical, i.e., the features described above with regard to the ear unit 12 of FIG. 2 will apply to both ear units.

Figure 3:
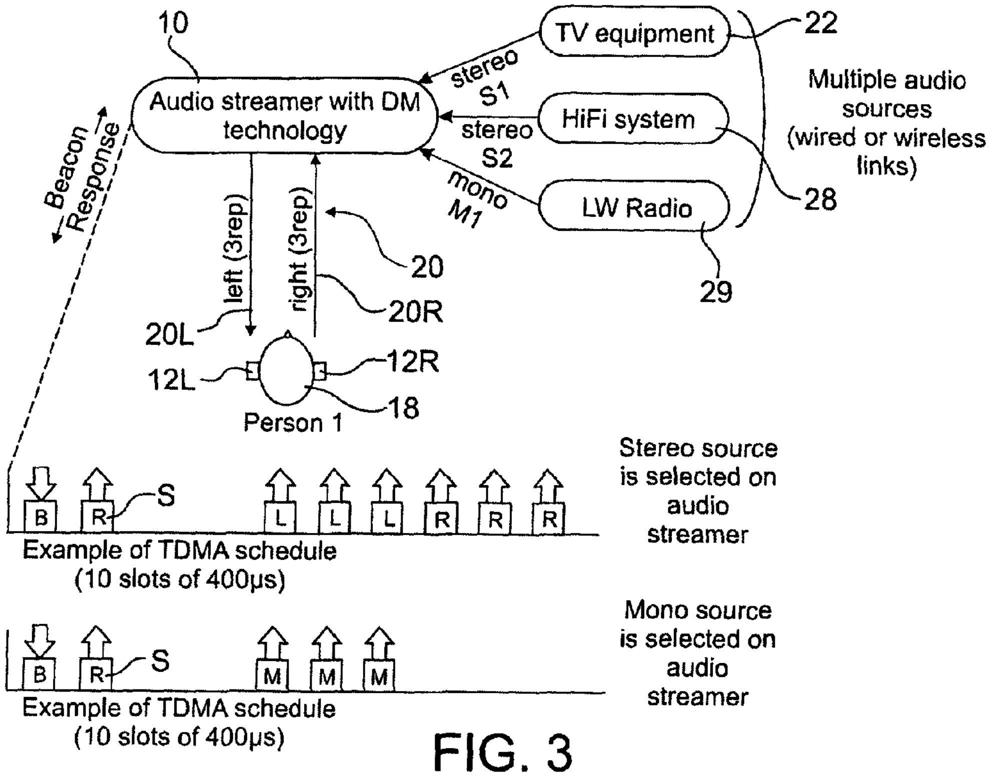
FIG. 3 is a schematic representation of an alternative example of a hearing assistance system.
Figure 4:
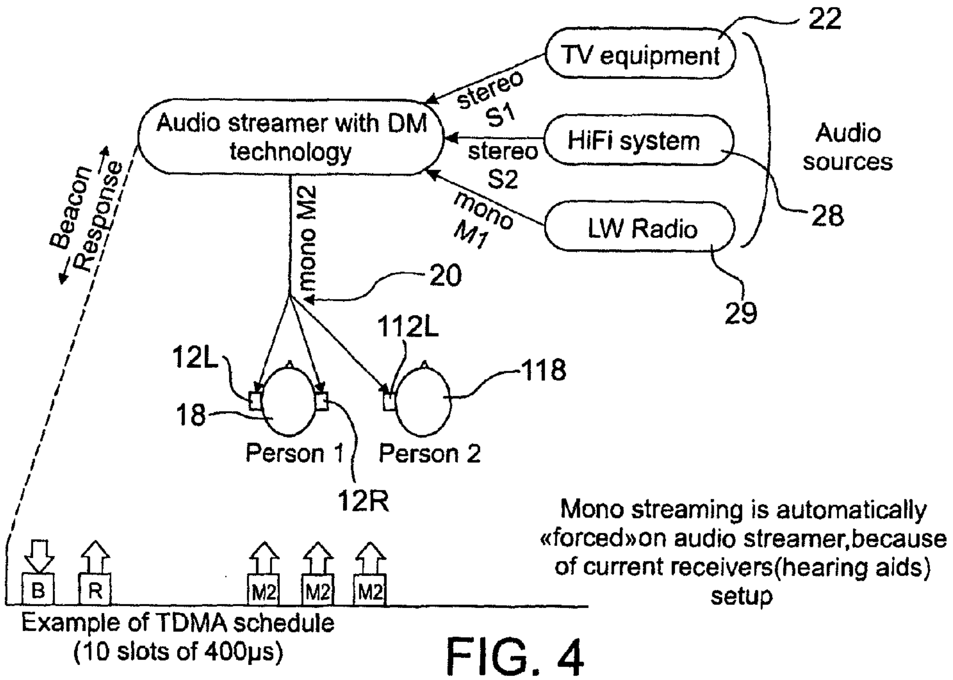
FIG. 4 is a view like FIG. 3, wherein a modified example is shown.

FIGS. 3 and 4 relate to examples of the invention, wherein the transmission unit 10 and the receiver units 14 form part of an audio signal transmission network for audio signal transmission using encoded audio data packets. Such a network system is described, for example, in International Patent Application Publication WO 2011/098142 A1 and corresponding U.S. Patent Application Publication 2012/0314890.

Such a network may utilize a TDMA scheme in a broadcast mode, wherein each audio data packet is transmitted subsequently three times, i.e., transmission of each data packet is repeated twice. Such protocol typically is limited in that the available bandwidth is not sufficient for transmitting three audio channels in parallel, so that it is, for example, only possible to transmit the right ear stereo channel 20R (with the data packets being designated by "W" in FIG. 3) and the left ear channel 20L (with the data packets being designated by "L" in FIG. 3) of a stereo audio signal, but not in addition also the receive mono signal (with the mono data packets being designated by "M" in FIG. 3).

In the example of FIG. 3, there is a single listener 18 and a plurality of audio sources, such as a TV set 22, a HiFi system 28 or a radio receiver 29, wherein the devices 22 and 28 provide for a stereo output signal, and the radio 29 provides for a mono output signal. The listener 18 may select on the transmission unit 10 (acting as an audio streamer) the audio source he wants to listen to. The transmission unit 10 adapts the TDMA schedule accordingly and transmits either a digital mono signal or a digital stereo signal.

The receiver units of the ear units 12 have been paired previously within the network of the transmission unit 10 and thus are able to listen to the beacons B periodically sent each 4 ms and can read all transmitted audio packets. In case that a stereo signal is transmitted, the right ear unit 12R would decode the right ear packets R, and the left ear unit 12L would decode the left ear packets L. In case that a mono signal is transmitted only, both ear units 12R and 12L would decode the same mono packets M.

The network communication may include a preliminary phase, wherein all capabilities of the ear units 12 would be exchanged with the transmission units 10, thereby selecting also the best audio bandwidth for the ear units 12.

In FIG. 4, an example is shown wherein there is a binaurally fitted listener 18, as in FIG. 3, but in addition there is a monaurally fitted second listener 118 wearing only a left ear unit 112L. Since the transmission unit 10 is paired with all ear units, it is aware of the configuration of each ear unit, so that it can automatically select the optimal type of audio stream.

In the example of FIG. 4, the transmission unit 10 may decide to transmit always a mono audio stream, even if the selected audio source provides for a stereo signal, since thereby it can be ensured that also the monaurally fitted listener 118 receives all audio information (in case that the signal provided by the audio source is a stereo signal, the transmission unit 10 would create a mono signal by mixing the left ear channel and the right ear channel of the stereo signal). The rule for selecting transmission of a mono or stereo signal by the transmission unit 10 may be as follows: if there is at least one listener with monaural fitting, i.e., wearing only a single hearing aid, then the transmission unit will stream a mono signal (and create, if necessary, the mono signal by mixing the stereo channels provided by the audio source); if there is no person with a single hearing aid in the network range, then the transmission unit will deliver a stereo stream, if a stereo audio source is selected, and a mono stream, if a mono audio source is selected.

Such control strategy requires not only initial knowledge of the hearing aid configurations in the network but in addition requires regular updates of the configuration information. Such update could be implemented, for example, by each ear unit regularly transmitting a spontaneous message S to the transmission unit 10, indicating the presence of the respective ear unit within the network. For example, if in the example of FIG. 4 the monaurally fitted listener 118 would leave the network range, the binaurally fitted listener 18 would be provided with a mono audio stream even in case of a stereo audio source, unless the transmission unit 10 would be aware of the fact that there is no longer a monaurally fitted user in the network. After having noticed the lack of a response message S from the ear unit 112L of the monaurally fitted user 118, the transmission 10 would adapt its transmission strategy to this fact and provide the binaurally fitted user 18 with a stereo stream when the selected audio source is a stereo source.

In the same manner, the audio bandwidth selected by the transmission unit 10 may be adapted to change in the network configuration (for example, if the hearing aid having the lowest bandwidth capability leaves the network, the audio bandwidth selected by the transmission unit 10 could be increased again).

Since there may be limits in the back-link range of the ear units, with the response message S probably not being received, there should be a delay setting inside the transmission unit 10 to conclude that an ear unit has left the network range.

In the system of FIGS. 3 and 4 the transmission unit 10 is able to detect whether the audio input is a stereo or a mono signal, which can be implemented by detecting the electrical signals on the audio jack and check if the signals are the same on both sides (in case of a mono source) or are only one side (in case of a mono source) or are different on both sides (in case of a stereo source). If the audio signal from the audio source is transmitted via a digital wireless audio stream (such as Bluetooth or DLNA) to the transmission unit 10, the stereo or mono feature may already be part of the audio profile. At the ear unit side (comprising a receiver unit detachably connected to a hearing aid or integrated within a hearing aid) the following information is always available: whether the ear unit is to be one at the right ear or at the left ear; and audio decoding capabilities, such as audio bandwidth limits (normal audio quality or high audio quality).

Such information available at the transmission unit 10 and at the ear units side, respectively, is exchanged between the ear units and the transmission unit 10 after being paired in the network maintained by the transmission unit 10.

Based on the information concerning the configuration of the ear units present in the network and on information concerning the selected audio source, the transmission unit 10 automatically adapts the audio stream with regard to stereo or mono, audio bandwidth, etc. In case that the ear unit of a monaurally fitted user does not respond after certain attempts, the transmission unit 10 will conclude that the respective listener has left the network range. However, if no response is obtained from one of the ear units worn by a binaurally fitted person, the transmission unit does not conclude that this listener has left the network range, as long as the other one of the ear units sends response messages.

What is claimed is:

1. A hearing assistance system, the system comprising:

an audio signal transmission unit for wireless transmission of a stereo audio signal comprising a left ear channel and a right ear channel, a first ear unit configured to be worn at one ear of a user and comprising a first hearing instrument and a first wireless audio signal receiver unit, wherein the first hearing instrument is adapted to store fitting parameters including gain setting and frequency response curves for the left ear or the right ear of the user and information as to whether there is a second ear unit worn at the other ear of the user, the second ear unit comprising a second hearing instrument and a second wireless audio signal receiver unit, and wherein the first receiver unit is adapted to decode, the left or the right ear channel and, in absence of a stereo channel, a mono channel of an audio signal and supply it to the first hearing instrument at least partially based on accessing the information stored in the first hearing instrument.

2. The system of claim 1, wherein the first audio receiver unit is detachably connected to the first hearing instrument.

3. The system of claim 1, wherein the second ear unit is adapted to provide the second receiver unit with the fitting parameters information as to which ear the second hearing instrument is fitted to has fitting parameters for, wherein the second ear unit is adapted to provide the second receiver unit with information as to whether there is a first ear unit worn at the other ear of the user.

4. The system of claim 3, wherein the first and second hearing instruments comprise means for binaural communication.

5. The system of claim 1, wherein the first and second hearing instruments are adapted for establishing a wireless link for achieving a binaural communication.

6. The system of claim 5, wherein the binaural wireless link is an inductive link.

7. The system of claim 1, wherein the first and second receiver units are adapted to communicate with each other via a wireless link, and wherein the information as to whether a second ear unit is present is derived from whether communication with the second receiver unit is possible.

8. The system of claim 1, wherein the audio signal transmission unit is adapted for analog transmission of the stereo audio signal.

9. The system of claim 1, wherein the audio signal transmission unit is adapted for digital transmission of the stereo audio signal.

10. The system of claim 1, wherein the audio signal transmission unit is adapted for transmission of the audio signal via an inductive link or frequency modulated link.

11. A method of providing hearing assistance to a user, the method comprising:

transmitting a stereo or mono audio signal, wherein the stereo audio signal comprises a left ear channel and a right ear channel;

receiving the stereo or mono audio signal at a first hearing device, wherein the first hearing device comprises:

a first wireless audio signal receiver, a first hearing instrument configured to store information as to whether the first hearing instrument is fitted to a left or right ear of a user and fitting parameters, wherein the fitting parameters include gain setting and frequency response curves for the left ear or the right ear of the user and whether there is a second ear unit worn at another ear of the user, wherein the second ear unit comprising a second hearing instrument and a second wireless audio signal receiver unit, and determining, based on the stored information, to receive the left ear channel, the right ear channel, and, in absence of the stereo audio signal, the mono channel of the audio signal; and providing the selected left ear channel, right ear channel, or mono channel to the first hearing instrument.

12. A hearing device, the hearing device comprising:

a first hearing unit configured to provide an audio output, wherein the audio output is a left ear output, right ear output, or mono output, and wherein the first hearing unit comprises:

a memory storing hearing setting information for the first hearing unit, wherein the hearing setting information includes gain settings, frequency response curves, and whether the first hearing unit is configured for a left ear or a right ear of a user, and whether the first hearing unit is part of a binaural fitting with a second hearing unit;

a controller configured to determine whether the second ear unit is being used and to provide left ear channel or right ear channel audio information to the first hearing unit or determine an absence of a stereo channel and provide the first hearing unit with a mono channel; and a receiver unit configured to communicate with the controller and receive instructions from the controller, and wherein the first receiver unit is configured to decode the left ear channel, the right ear channel, or a mono channel to the first hearing unit based at least in part on instructions from the controller.

13. The hearing device of claim 12, further comprising:

an interface to communicate between the first hearing unit and the receiver unit.

14. The hearing device of claim 12, wherein the receiver unit further comprises an antenna and another controller, wherein the other controller is configured to supply processed audio signals to the first hearing unit.

* * * * *